US007970795B2

(12) United States Patent
Kemp et al.

(10) Patent No.: US 7,970,795 B2
(45) Date of Patent: Jun. 28, 2011

(54) DATA MODEL DEVELOPMENT TOOL

(75) Inventors: Stephen John Kemp, Preston (GB);
Katherine A. Nicholson, Fulham (GB);
Wim Decraene, London (GB); David Hillewaere, Aalst (BE)

(73) Assignee: Accenture Global Services Limited, Dublin (IE)

( * ) Notice: Subject to any disclaimer, the term of this patent is extended or adjusted under 35 U.S.C. 154(b) by 710 days.

(21) Appl. No.: 10/538,664

(22) PCT Filed: Dec. 10, 2002
(Under 37 CFR 1.47)

(86) PCT No.: PCT/GB02/05588
§ 371 (c)(1),
(2), (4) Date: May 25, 2007

(87) PCT Pub. No.: WO2004/053751
PCT Pub. Date: Jun. 24, 2004

(65) Prior Publication Data
US 2009/0222470 A1 Sep. 3, 2009

(51) Int. Cl.
*G06F 7/00* (2006.01)
*G06F 17/30* (2006.01)
(52) U.S. Cl. ........................................ 707/802; 707/803
(58) Field of Classification Search ........................ None
See application file for complete search history.

(56) References Cited

U.S. PATENT DOCUMENTS

| | | | | |
|---|---|---|---|---|
| 5,933,830 A * | 8/1999 | Williams | ..................... | 707/100 |
| 5,937,408 A | 8/1999 | Shoup et al. | | |
| 5,970,493 A * | 10/1999 | Shoup et al. | ................... | 707/100 |
| 6,073,134 A * | 6/2000 | Shoup et al. | ................... | 707/100 |
| 6,108,657 A * | 8/2000 | Shoup et al. | ................... | 707/100 |
| 6,418,427 B1 * | 7/2002 | Egilsson et al. | ....................... | 1/1 |
| 6,480,842 B1 | 11/2002 | Agassi et al. | | |
| 6,694,322 B2 * | 2/2004 | Warren et al. | .................. | 707/101 |
| 6,707,454 B1 * | 3/2004 | Barg et al. | ...................... | 345/440 |
| 7,333,982 B2 * | 2/2008 | Bakalash et al. | ................... | 707/5 |
| 2002/0070971 A1 * | 6/2002 | Brown et al. | ................. | 345/775 |
| 2002/0091681 A1 * | 7/2002 | Cras et al. | .......................... | 707/3 |
| 2002/0116299 A1 * | 8/2002 | Diamond et al. | ............... | 705/28 |
| 2002/0144174 A1 * | 10/2002 | Nwabueze | ......................... | 714/1 |

FOREIGN PATENT DOCUMENTS

WO WO 01/11497 A1 2/2001

OTHER PUBLICATIONS

International Search Report dated Aug. 12, 2003 for International Application No. PCT/GB2002/05588.

* cited by examiner

*Primary Examiner* — Wilson Lee
*Assistant Examiner* — Tuan Pham
(74) *Attorney, Agent, or Firm* — Finnegan, Henderson, Farabow, Garrett & Dunner, LLP (57) ABSTRACT

A tool for creating a multi-dimensional data structure in order to integrate data from disparate data sources. The tool facilitates the mapping of a new multi-dimensional data structure to one or more disparate data sources and allows the documentation of gaps and methods for bridging those gaps that may be implemented at the disparate data source sites. The tool may also facilitate the creation of mapping files for historical data conversation. The tool may be used in many types of environments across multiple industries including financial and insurance industries.

23 Claims, 5 Drawing Sheets

DATA MODEL DEVELOPMENT TOOL

FIELD OF THE INVENTION

The present invention relates to a tool for creating and managing a data model, more particularly, the invention relates to a development tool for generating, populating and managing a centralized data model that may be associated with one or more disparate systems.

DISCUSSION OF THE RELATED ART

Businesses, such as those in the banking industry, must often be able to generate various types of reports for both internal and external reasons. Each of these reports is unique in the sense that each must satisfy specific disclosure requirements as they relate to their purpose for being generated. These requirements will typically drive the types of data needed for the reports as well as how the data is to be integrated and processed. For instance, in the banking industry the reports that are for external purposes, such as reports for statutory or regulatory purposes, may be required to follow International Accounting Standards ("IAS"). Requirements for such reports will generally be substantially different from those reports that are generated for internal purposes such as financial management purposes. Consequently, the types of data required, how the data is processed and the format of the disclosed data, will be significantly different depending upon the purpose of the report.

Large sized businesses typically have greater reporting needs then those of smaller businesses. That is, larger businesses generally have a duty to generate more reports than smaller businesses because a larger company is more likely to face more reporting obligations. For instance, larger businesses typically face more reporting requirements relating to statutory, regulatory and internal reporting requirements. This is particularly true with businesses that operate in more than one country. These multi-nationals that have offices or subsidiaries located on foreign soil will generally have to meet, in addition to the reporting requirements of its home office (if it has one), the local reporting requirements of the host countries of the individual offices and subsidiaries. Similarly, for companies that operate different types of businesses, there will also be a need for generating additional reports to meet the regulatory or statutory reporting requirements for each of the businesses.

In order to facilitate its various reporting needs, a business may create multiple data models, each data model storing data in a format that is compatible to one or more reports. The data that is stored may be divided into data items. Data items may be viewed as pieces of data that may be processed for use in reports or may be directly retrieved and used in reports. These multiple reporting needs are as a result of need to satisfy various reporting requirements such as statutory requirements, internal financial controls, shareholder reporting requirements, and the like. Each of these reporting requirements may require that the reports generated must meet certain standards such as national Generally Accepted Accounting Principles ("GAAP"), International Accounting Standards ("IAS"), and the like. In order to meet reporting needs, companies may create a data model that provides a data structure in databases that reflects the format and structural requirements of a report being generated. These data models facilitate the generation of reports that meet the formatting and content reporting requirements of the business. As a result, some companies may maintain multiple data models for each report that they may generate. For example, in the banking industry, financial data is often stored in data models called "chart of accounts." A banking company may maintain several charts of accounts. This may be particularly true when a business has multiple offices or subsidiaries located in remote locations or operate several types of businesses that provide different types of products and services. For instance, many companies in the banking industry operate internationally, having offices throughout the world. Each of these offices may offer different sets of products and services. One office may only specialize in providing commercial and personal loans while another may only specialize in providing investment services. Because of the differing reporting requirements that may exist in each remote foreign location and/or the type of services offered by each location, each of the offices may be required to maintain their own chart of account formatted to reflect the needs of that particular location. In order to support reporting of the entire business group, whether that is external statutory reporting or internal financial management reporting, there is a need to collate the required data from across the disparate businesses around the world. Hence, a group-wide chart of account (i.e., data model) is required. This group-wide chart of account (i.e. data model) will be required to be populated by one or more sources. A source is a system, an office, a subsidiary, a type of business or any segment of the business organization, which may maintain the required data. This may result in a very decentralized system of maintaining and collecting data and may result in inefficiencies and delays in generating reports. The decentralized system of collecting and storing data is particularly troublesome when a business needs to integrate disparate data from disparate sources through a, central location or office, and to generate reports by processing the disparate data in order to meet some internal or external reporting requirement.

In order to facilitate the multiple reporting needs of a business organization, one conventional approach has been to generate an electronic file formatted according to the report being generated and submitting the file to various groups within the business organization to solicit the desired data from the groups. For instance, suppose the central office of the banking organization described above is required to generate a report requiring the integration and processing of data from multiple source sites (e.g., the organization's various business groups and offices). In order to do so, the organization creates a centralized data model located at their central office. The centralized data model, called the target data model, is structured in accordance with the requirements of the report being generated at the central office. Suppose further that the business organization has many offices, each maintaining their own disparate data model and each model designed and structured to facilitate local reporting needs. In order to develop a system for obtaining the necessary data for generating the comprehensive report, the business organization must develop a way to integrate and process data from various sources that may not be compatible. In order to do so, the conventional approach would be to submit an electronic file, which is typically formatted according to the central data model. Such a file, which will typically be created using commercially available spreadsheet application such Microsoft's Excel™ or other commercially available spread sheet applications, will be sent to each source to be populated and/or mapped. Unfortunately, because the data models at each source may not be compatible with the target data model (and hence, will not be compatible with the sent file), the data stored at each source may need to be reformatted or processed further before being used to populate and/or mapped to the file that was received. This is typically a long arduous process that is time consuming and costly. Other problems and issues may arise when conventional approaches are used. For instance, since the populating and/or mapping of files sent to each source location is typically done locally, it is difficult for those at the central office to oversee and manage the process of mapping data for the target data model. That is, since the mapping and populating are done at the source sites rather than at the central site, if there are any data gaps between the requested information, as defined in the file, and what is actually stored at the source data structure, then the central office would not be able to see that there are gaps. As a result, the central office would have no knowledge of the existence of the gaps nor would they be able to determine how the gaps were bridged. Thus, those at the central office would not only have limited ability to review the mapping process between the source data model and the sent file but will also have very limited control over the mapping procedure if at all.

As illustrated above, developing new systems and capabilities for reporting requirements often generates a need to map the target data model(s) to old data model(s). For instance, in financial or accounting practices, whenever new charts of accounts are created as a result of implementing new financial system[s], a need may arise which requires that new data models be mapped to old data model(s). This can be a complex endeavor in situations where there are many old financial systems being replaced and each of those systems has a different data model (e.g., chart of accounts) with a different number of dimensions of analysis in each. For example, in order to remain competitive, many large businesses have discovered a need to integrate data from various sources. A large corporation having multiple subsidiaries located in remote locations may have previously maintained separate financial systems for each subsidiary. These financial systems may maintain separate ledgers. Each of these subsidiaries may also maintain separate charts of accounts that are unique from other charts of accounts belonging to other subsidiaries. The dimensions and data format may be unique to each chart for each subsidiary. In order to remain competitive and to efficiently manage multiple subsidiaries, a business may want to unify and/or integrate incompatible data from its subsidiaries. However, as illustrated above, this is typically a time intensive and costly venture that businesses will preferably like to avoid.

SUMMARY OF THE INVENTION

Accordingly, the present invention is directed to a robust data model development tool (herein "development tool") that facilitates the development of new data structures in dynamic environments. The development tool may be used to create multi-dimensional data models structured for use in various types of environment including financial, credit management, insurance, and the like. The development tool may further be used to populate multi-dimensional data models. The data model development tool may be supported by a combination of both software and hardware components including a relational database, which enables the development tool to map and integrate any number of old data structures to one or more new data structures across the dimensions sought in the new structure[s].

The development tool may be used in all projects, across industry, where new data systems are being implemented with new data structures. The tool may be particularly relevant in certain situations. For example, when there are multiple old data structures that need mapping to a new data structure of accounts. The development tool may be further used when a new data structure has a different number of dimensions of analysis from the old data structure which requires combinations across dimensions to be defined or when an integrated data structure must be obtain from several data structures in order to implement new ERP systems, general ledgers, and other consolidated systems. Still further, the development tool may be used when a new data structure is needed to support new reporting requirements with additional data required or when a new design of a standard data structure is needed to ensure consistency of financial data across a business, or when a new data structure is needed to support a broad set of reporting requirements.

The development tool according to the present invention may speed up and control the process by which a new data structure, for example, the dimensions of a chart of accounts, may be populated and mapped to existing source systems.

The development tool may offer several advantageous features. These include, for example, its ability to immediately be used for data requirements across industry/type of requirement because of its shell like framework. The development tool may allow dimension values to have attributes/characteristics attached. The development tool may further allow the establishment of valid/invalid combinations of values across dimensions. The development tool may provide functionality to map data requirements to existing consolidation systems, general ledgers, data marts, source systems and the like. The development system may further provide a functionality, which allows the referencing of data requirements to the source system to each organizational unit. The development tool may further provide output reports, which structure data requirements in a workable Excel™ format.

The data model development tool according to one embodiment of the invention has a dynamic framework, which is essentially a "shell." The shell like framework allows the development tool to be used for creating and managing data models structured for various purposes including financial, credit risk management, insurance risk assessment, and the like.

According to another embodiment of the present invention, the development tool may be used to model data requirements of any data model in a multi-dimensional format. The relationship between values within each dimension maybe captured and maintained in the database.

According to another embodiment of the present invention, the development tool allows businesses to create a new data model that may be centralized and meet requirements of multiple reports. The development tool allows those at remote source sites (e.g., offices/divisions/subsidiaries/business segment) to access the centralized data model, make changes to the centralized data model and map the data model to source data models. For instance, by using the development tool, those in remote offices/division may first map from the centralized data model to their local data model (using for example Microsoft Access™) while continuing while still maintaining their local data model and updating the new centralized data model through their local data model using their normal spread sheet applications such as Excel. The mapping step to the local offices/division may allow for documenting comments, which may be viewed by others providing useful information such as the source of the data used in the centralized data structure and how gaps may have been bridged. In doing so, those at the central site will have better control over the mapping process and a central view of what the gaps are, how the gaps were resolves and whether any augmentation are needed. When specific information is sought from a particular remote site by those at the central site and that particular information is not available at the central site, the development tool allows those at the central site to request for the information from the appropriate remote site and to state reasons for requesting such information. This may eventually lead to mapping directly to the remote site's system obtaining the requested information directly.

According to another embodiment of the present invention, the development tool may be used in a financial environment to create chart or charts of accounts for multi-division/multi-subsidiary/multi-location businesses. The development tool may map the reporting requirements of a new financial system to current general ledgers and/or operational systems associated with each division and/or each subsidiary and/or each location.

Additional features and advantages of the invention will be set forth in the description which follows, and in part will be apparent from the description, or may be learned by practice of the invention. The objectives and other advantages of the invention will be realized and attained by the model particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, examples of which are illustrated in the accompanying drawings.

Figure 1:
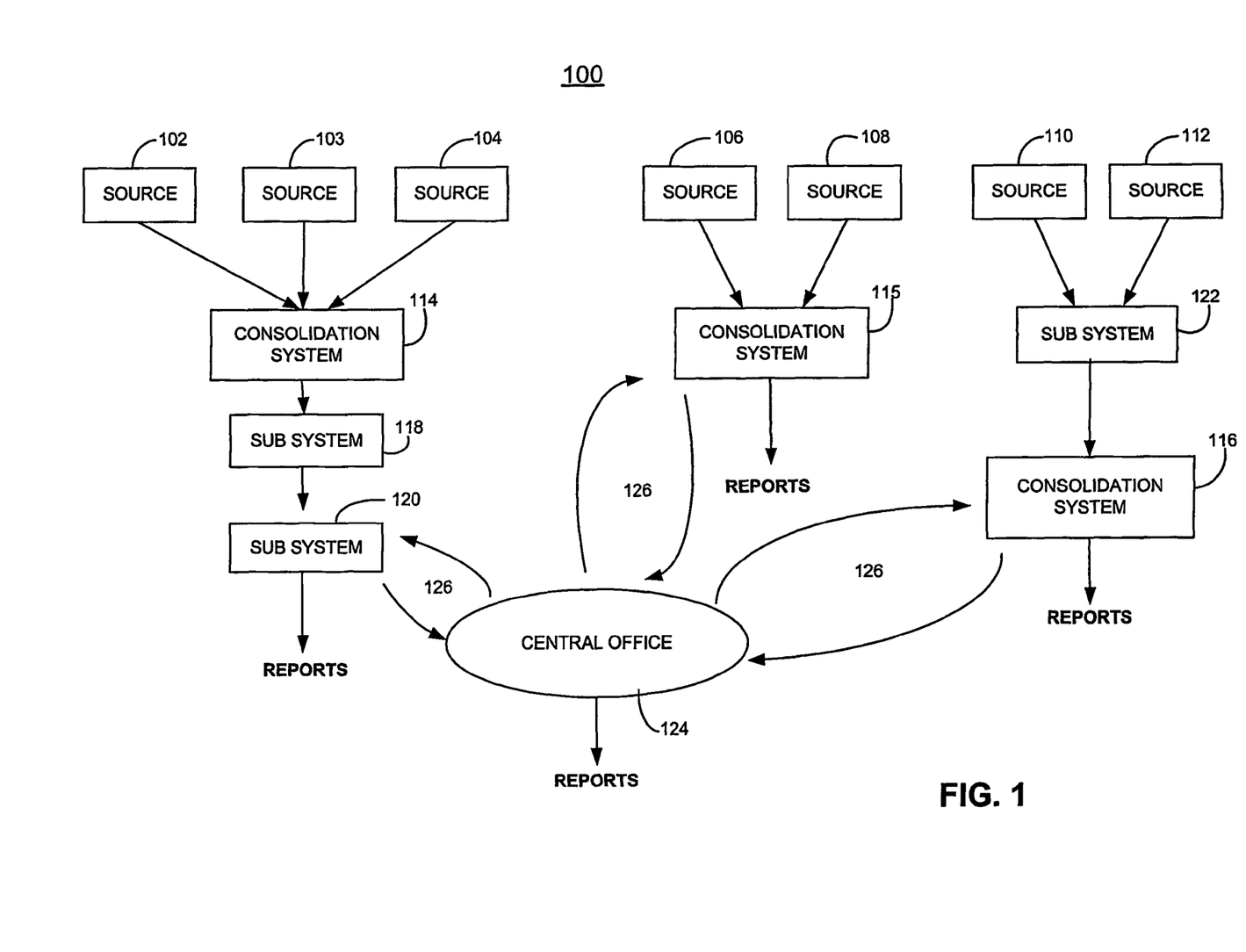
FIG. 1 is a block diagram of an exemplary business organization's organizational structure for generating reports when conventional approach is used for reporting requirements.

FIG. 1 is a block diagram depicting an exemplary business organization's organizational structure 100 for generating a report when employing a conventional approach for meeting multiple reporting requirements. The business organization may be any type of business organization such as a banking/ financial or a loan company. The business organization having source sites 102 to 112. The source sites 102 to 112 may represent offices, subsidiaries, divisions, business units, and the like of an organization. The source sites 102 to 112 may maintain disparate source data models, which are structured according to local reporting needs. The source sites 102 to 112 may be located in foreign locations and/or offer different products and services. The data models at each of the source sites 102 to 112 may not be compatible because their reporting requirements are distinct or their local needs, such as regulatory and/or managerial requirements, are specific to the source site. For example, the purpose of a source data model associated with a particular source site may be for providing financial reporting that must be formatted according to national Generally Accepted Accounting Principles ("GAAP") while other source data models associated with other source sites may be for non-financial purposes such as for internal management reporting requirements. Each of the source data models may have differing dimensions and dimension values (which will be discussed below). As a result, data that originate from each of the source data models are formatted differently and may be incompatible for purposes of integration and processing. The sources 102 to 112 may be in communication with consolidation systems 114 and 116. The consolidation systems 114 to 116 may integrate and process the data from sources 102 to 112. The consolidation systems 114 to 116 may maintain their own data models that are generated by integrating and processing data from the source sites 102 to 112. The data from source sites may also go through one or more sub-systems 118 to 122 before being used in a variety of reports. Sources 102 to 112 may also directly generate reports. As with many businesses, in this exemplary organization, a central office 124 oversees the entire business operation. The central office 124 may maintain its own "centralized" or "target" data model[s]. Each model may be associated with a report. The target data model [s] may be structured and formatted to meet the associated report's formatting and structural requirements. Each target data model will typically be structured such that it meets the requirements of its corresponding report. In certain sectors of the business world, such as banking and financing, certain data models are referred to as "charts of accounts."

The target data model[s], in this example, is distinct from those maintained by each of the sources 102 to 112. That is, the architecture of the conventional organizational structure 100 makes it difficult to generate reports that require data from one or more of the sources 102 to 112. In such an organizational structure 100, each of the sources 102 to 112 may store their own data formatted according to their own disparate data model. As a result, the data from these sources will often have to be restructured and even processed further in order to be usable for generating the integrated reports. In order to accommodate reporting requirements that require the integration of disparate data formatted according to distinct data models, a new organizational structure may be needed.

Figure 2:
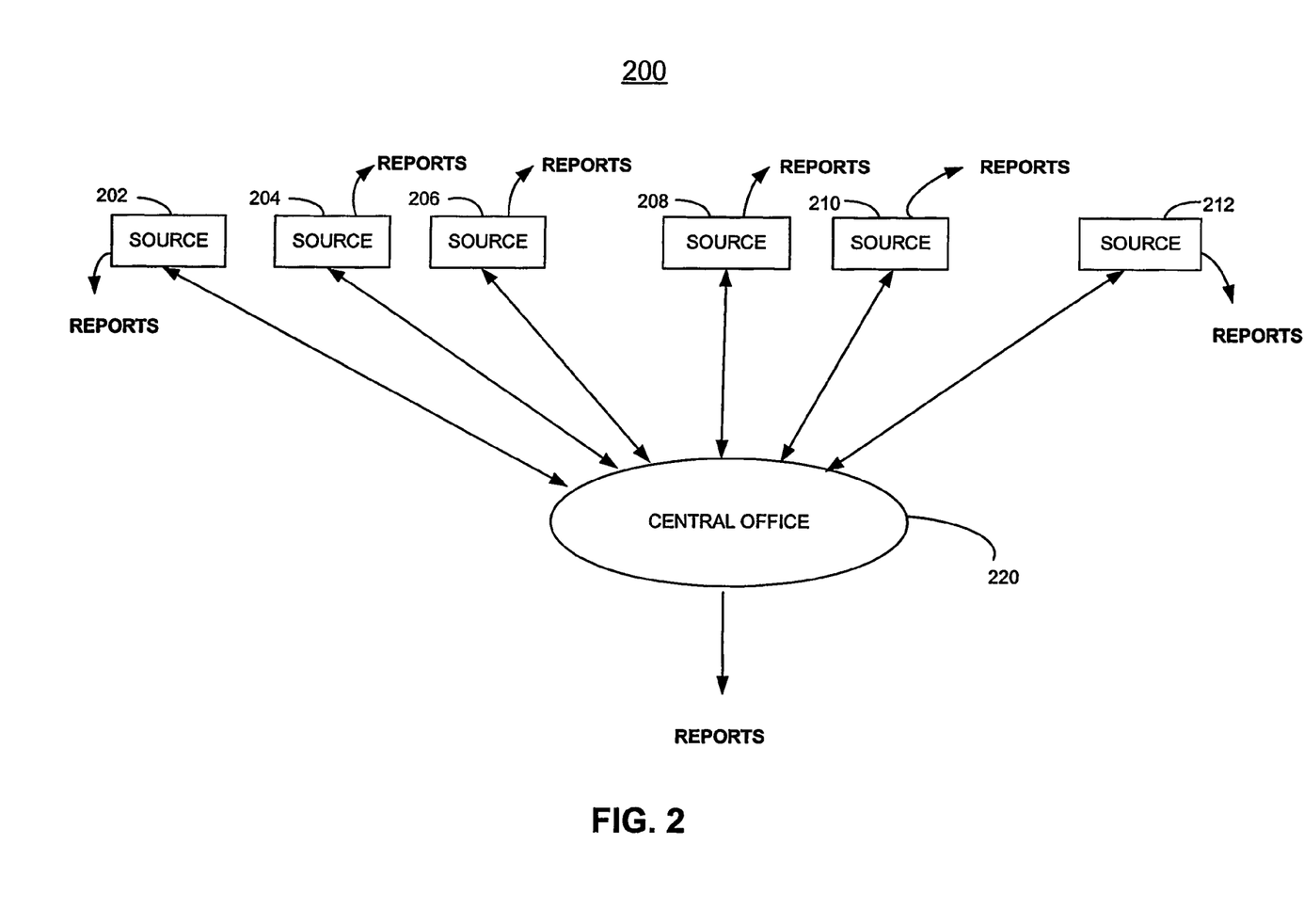
FIG. 2 is a block diagram of an exemplary business organization's organizational structure for generating reports when the development tool according to an embodiment of the present is used.

The data model development tool (herein "the development tool") according to one embodiment of the present invention assists in the creation and maintenance of centralized (i.e., target) data model[s]. The development tool further simplifies data processing and data integration for generating reports in complex organizational structures. FIG. 2 is a block diagram depicting an exemplary business organization that has employed the development tool to create a new organizational structure 200, which accommodates all the reporting needs of the entire business organization. The development tool, according to the present invention, can facilitate the development and maintenance of such organizational structure. In this organizational structure 200, the use of the development tool allows the business to forego the need for sub-systems in order to process and/or consolidate data. Thus, there are no consolidation systems or subsystems because the data associated with source data model[s] at each source sites 202 to 212 may be directly mapped to the target data model at the central office 220. Since each of the source sites 202 to 212 directly interfaces with the central office 220 (i.e., target data model[s]), the mapping process as well as the gap bridging process may be directly monitor by those at that central location. Reports may be generated both locally at the source sites 202 to 212 and/or at the central location 220. Gaps may also be bridged at source sites 202 to 212 or at the central location 220.

In order to facilitate a better understanding of the novel features of the present invention, certain concepts and terms are described below. Data models are data structures that provide structural organization to databases such as relational databases. In order to fully appreciate novel aspects of the present invention, the following description of data models is provided. A data model may be defined by dimensions, dimension values, attributes and attribute values.

A dimension is a clearly distinguishable view of data. Dimensions are linked to data and can be used to identify, quantify, parse, classify, integrate, organize and view specific data. Each dimension is made of a list of values. The list of values of one dimension may be viewed against the list of values of another dimension once the combination has been created as described below. A dimension may have attributes. In that case, each value of a dimension will have an attribute value. Attributes are generally specific to a specific dimension. A dimension may have hierarchies. A hierarchy is a rollup of a sub-section of the list of values based on the attributes assigned to that list of values. Each dimension contains a list at base level, which is the lowest level of detail for a specified dimension. An attribute is a specific item tied to a dimension. For example, suppose there is a dimension called organizational dimension. Associated with the organizational dimension are legal entities (i.e. the corporate entity through which business is conducted). Then each legal entity could have an attribute of segment type, country and currency. The attribute of one dimension may only be viewed against the list of values of that dimension. The attributes on one dimension cannot be viewed against the list of values of another dimension.

The following example describes the relation between, dimensions, dimension values, attributes and attribute values. Suppose a data model has been created for a banking company doing business in the financial industry. In order to meet an external reporting requirement, the model created should be structured having certain dimensions. For instance, a dimension for "products" may be created. Examples of dimension values associated with the "products" dimension includes, for example, corporate loans, mortgages, home credit, and personal loans. The model may also include a dimension for "maturity." Examples of dimension values that may be associated with the "maturity" dimension could include, for example, less than three months, three to six months, six to eight months, and the like. A third dimension defined for the model may be for "industry classification." Examples of dimension values associated with the "industry classification" dimension includes for example, retail business, utility services, and the like. Specific attributes will be associated with each dimension. For example, for the product dimension described above, there may be an attribute called "interest" associated with that dimension. Examples of attribute values that may be used in the "interest" attribute includes fixed-interest and variable-interest rates.

Whereas dimensions may be seen by other dimensions and can be mixed across other dimensions, attributes are specific to each dimension and can only be seen by the dimension it is associated with. For example, a system user may view corporate loans that are due between three and six months for retail business. This is the mixing of three dimensions, product, maturity and industry classification.

Figure 3:
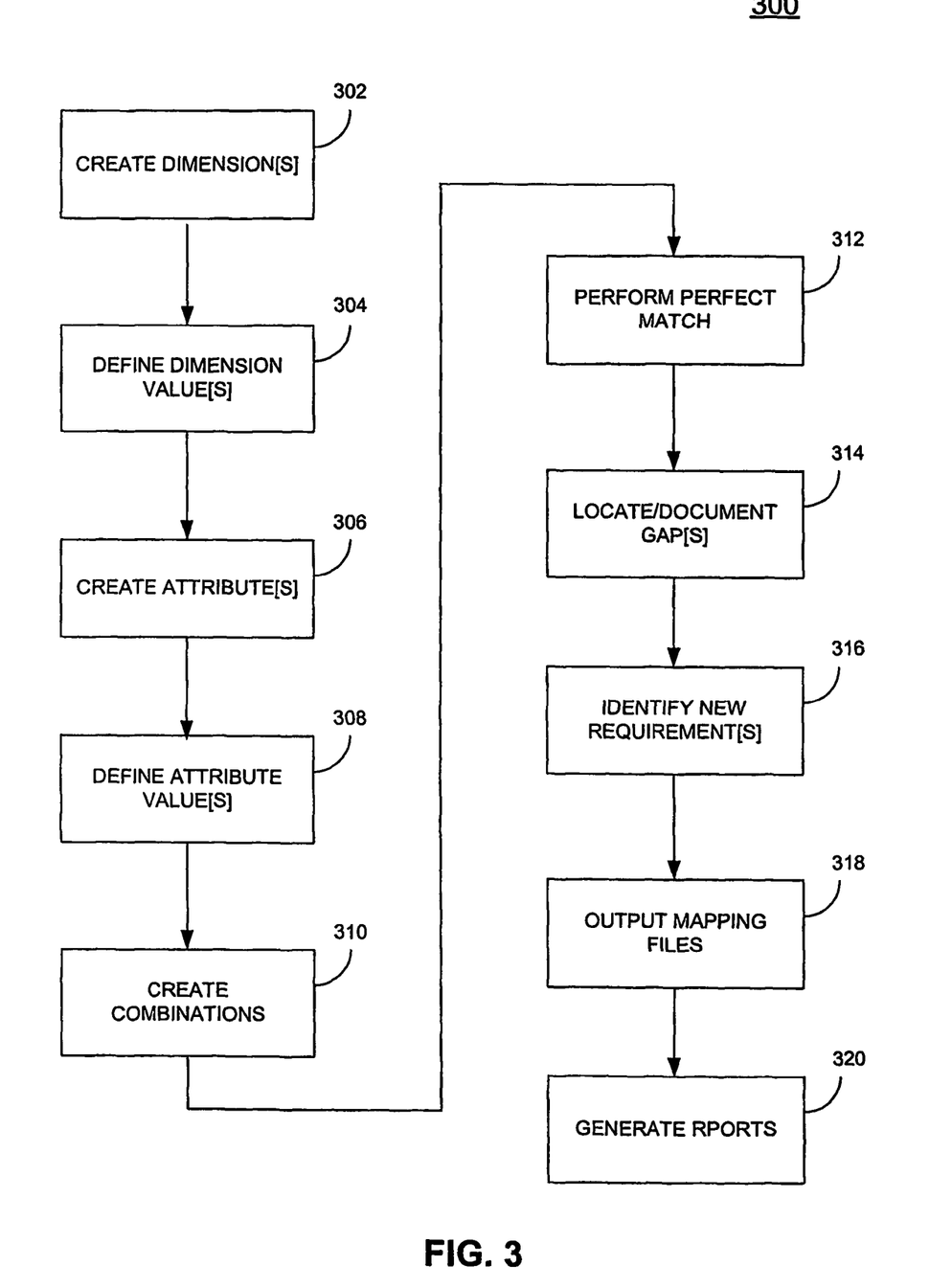
FIG. 3 is a process for creating, mapping and populating a target data model according to one embodiment of the present invention.

Referring to FIG. 3, which shows a process 300 for creating, mapping and populating of a target data model. The process 300 includes two phases. The first phase, which includes steps 302 to 310 are steps for setting up the structure for the target data model. The second phase includes step 312 to 318 which are steps used to facilitate the populating of the target data model.

The first phase of the process 300 begins at step 302 when dimensions are created for the target data model. In this step, each dimension is assigned a names. For instance, in financial data models, an "account" dimension will be one of the first dimensions to be created. Other dimensions can then be created to indicate different ways of analyzing the data stored on the accounts. Each dimension may be created by naming the dimension and optionally, providing a short description of the dimension. At step 304, defined dimension value[s] for the dimension[s]. For example, in the financial data model introduced above, examples of dimensions are "product", "maturity" and "industry classification", dimension values for these examples could include for example, "corporate loans", "mortgages", "home credit", and "personal loans" under the "product" dimension; "less than three months", "three to six months", "more than 6 months" under the "maturity" dimension; and, "retail business", "utility services", and "financial service" under the "industry classification" dimension. At step 306, create attribute[s] and associate the attribute[s] to a dimension. At step 308, attribute value[s] are defined for the attribute[s] created at step 306. For example, in the financial data model introduced above, examples of attributes on the product dimension could include "interest" and "income basis". The attribute values of these attributes could then be "variable interest" and "fixed interest" under the "interest" attribute; and, "interest income" and "fee income" under the "income basis" attribute. As previously described, an attribute is preferably tied to only one dimension. Attribute values provide more information or characteristic of the value for a particular dimension value. An attribute for a dimension may be created by creating a name for the attribute and defining the attribute value[s] for the attribute. In step 310, combinations are created. In order to retrieve specific data or to process a particular piece of data, dimensions that define the desired data item are linked. The linking of dimension for such purposes is called a "combination" of dimensions. For instance, in the previous example described above, "corporate loan/six to eight month maturity/retail business" is a combination. Note that if specific maturity date requirements were not of interest then the combination used to retrieve the appropriate data would be "corporate loan/retail business." In such a situation, clearly, the data obtain would be broader than the data retrieve for the corporate loan/six to eight month maturity/retail business combination because there is no limitation as to the maturity dimension. Thus, all data relating to all of the maturity possibilities (i.e., zero to three months, three to six months, six to eight moths, and the like) would be included so long as the product and industry classification values (i.e., corporate loan and retail business) for the data are satisfied.

The second phase of the overall process 300 begins when a perfect match is performed at step 312. In this step, each combination is mapped for each dimension value to source system and document. In this step, data items in the target data model is mapped to corresponding data items in the source data model[s]. Since the source data model[s] will likely be structured differently for the target data model, gaps will likely be present. Therefore, at step 314, identify and document all gap[s] if any exists. The description of how the gap will be bridged, that is how the local site or office will provide the required data, may be documented. At step 316 identify new requirements. It may be that the system at the local site or office onto which the target data model is being mapped, has additional data values that are required for their local reporting requirements, which they require adding to the target data model. They would document such data values as additional data requirements, which would be added to the target data model. In step 318, mapping files may be generated. The mapping files may be used for historic data conversation. Relationships between data items in different data models based on mapping may be stored as mapping files. The use of these mapping files for historical conversation may be accomplished, for example, by using historical data to generate data items based on the historical data and the relationship defined by the mapping stored in the mapping file. This exercise may be needed, for example, when historical data are needed for comparison to current data figures. In another example, suppose an account in the target data model is derived from three accounts located in a source data model. The map linking the three accounts in the source data model to the target data model may be saved and used in the future to update the target data model when the accounts of one or more of the source data models changes. The data from the source data model and used to generate the data for the account at the target data model may be historic data or current data thus enabling users to make comparison between past and current data. Optionally at step 320, reports may be generated. These reports may be helpful in monitoring and managing stored data relating to target data models. These reports include combination reports, hierarchy reports, and mapping reports. A more detailed description of these reports is described below.

Figure 4:
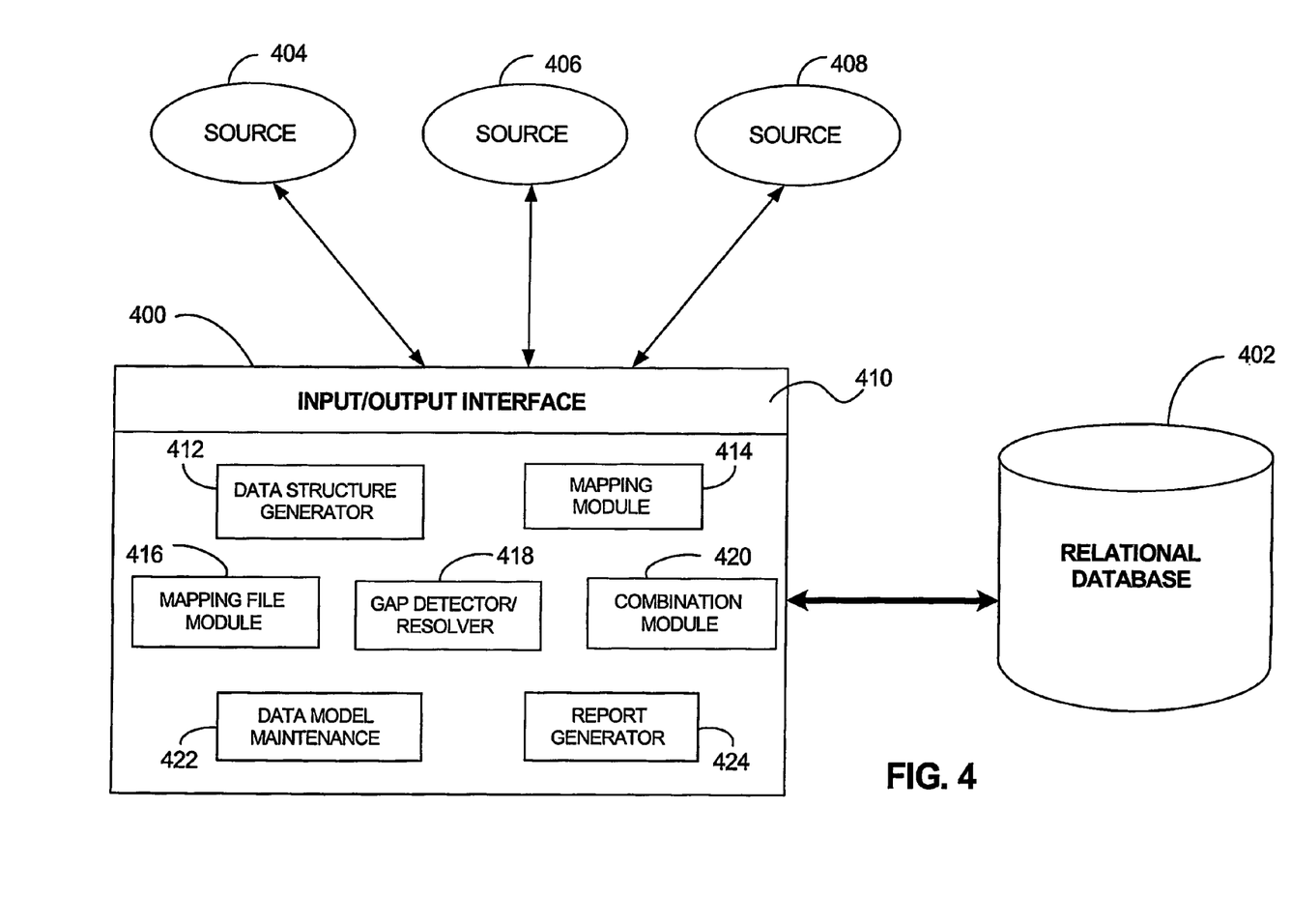
FIG. 4 is a block diagram of a data model development tool according to one embodiment of the present invention.

FIG. 4 is a block diagram of a data model development tool 400 according to one embodiment of the present invention. The development tool 400 may be embodied in, for example, a workstation, a server, a network of computer devices, or the like. The development tool 400 is in communication with a relational database 402. The development tool 400 may also be in electronic communication with one or more sources 404 to 408 via the Internet, Intranet, LAN, WAN, and the like. The development tool 400 may communicate to the sources 404 to 408 through an Input/Output interface 410. In development tool 400 may comprise of various modules to provide various functionalities. These include a data structure generator 412, a mapping module 414, a mapping file module 416, a gap detector/resolver module 418, a combination generator module 420, a data model maintenance module 422 and a report generator module 424. The modules depicted in this figure may be embodied in, for example, a programmable recording medium such as a computer disk. A number of commercially available database management applications, such as Microsoft Access™, may be used as platforms for the development tool 400. The data structure generator module 412 facilitates the creation of data structures by allowing users to define dimension[s], dimension value[s], attribute[s] and attribute value[s]. The module 412 may also facilitates the documentation of comments regarding data models created by the development tool 400. In particular, the module 412 may facilitate the documentation of comments/descriptions as they relate to the dimensions, dimension values, attributes and attribute values of the data model being generated. The mapping module 414 facilitates the mapping of data items in the target data model to source data models. The mapping file module 416 is used store, access and maintain mapping generated by the development tool. The gap detector/resolver module 418 is used to detect data gaps and may facilitate the bridging of those gaps. The gap detector/resolver 418 allows the documentation of comments relating to gap[s] and how the gap[s] may have been bridged. This capability can be very beneficial for monitoring and tracking gaps and the bridging of those gaps. Combination module 420 facilitates the creation, storing and documentation of combinations. Data model maintenance module 422 facilitates the maintenance of data models. In particular, the module 422 may be helpful in maintaining target data models. For instance, changes to target data models may be made by those at source sites 404 to 408 to reflect the additional data requirements of the source sites. Thus, target data models may continuously evolve as those at the source sites make changes to the target data model in order to accommodate ever changing local requirements. The report generator module 424 facilitates the generation of various reports in order to monitor various aspects of target data model[s]. These reports include reports for combination reports, hierarchy reports, and mapping reports.

According to one embodiment of the present invention, the data model development tool is implemented in a financial services network commonly associated with international banking and insurance. In international banking and insurance, companies may maintain one or more data models called charts of accounts. Multiple charts of accounts may be needed in order to meet the numerous reporting requirements that typically face an international banking business having offices in a number of countries and offering a wide range of products and services. These charts of accounts may be maintained in relational databases. Companies in this industry often have a number of offices and subsidiaries located throughout the world. Each of these offices and subsidiaries may maintain one or more chart of accounts, each configured to meet local needs. The companies will also maintain a central office that may be at the heart of the company's organizational structure. As a result, the central office may be responsible for providing comprehensive reports to third parties based on data from all corners of the organization. The central office may also maintain one or more charts of accounts, which will typically not be compatible with charts of accounts maintained by source systems of its offices and subsidiaries.

In this setting, the data model development tool 400, according to one embodiment of the present invention, may provide a controlled environment in which a multi-dimensional financial reporting structure can be created and populated with values centrally. Further, the development tool is able to provide a way of tracking and monitoring data associated with data models. For instance, in this embodiment of the present invention, the development tool process of identifying sources of the required data (i.e., mapping to existing financial and non-financial systems) can be undertaken in a decentralized manner. In order to meet data requirement, the target data model may be mapped to existing consolidation systems, general ledgers, data marts, source systems, and the like. However, not all of the data items needed for the target data model may be available in the existing consolidation systems, general ledgers, data marts, source systems, and the like. The development tool, according to the present invention, can facilitate the documentation of these data gaps and the plan for bridging these gaps.

Figure 5:
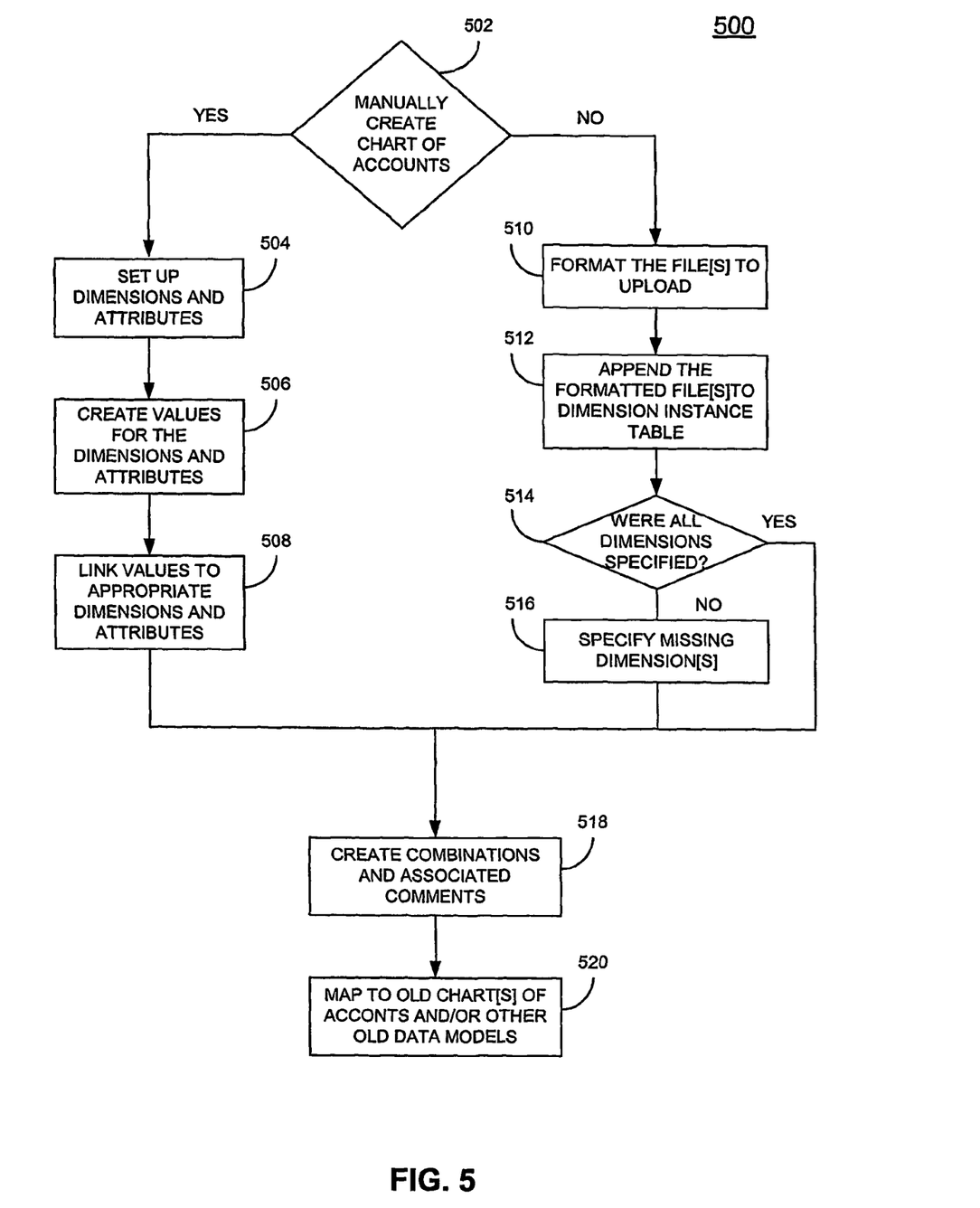
FIG. 5 is a process for creating, mapping and populating a new multi-dimensional chart of accounts according to one embodiment of the present invention.

FIG. 5 shows a process 500 for creating, mapping and populating a new multi-dimensional chart of accounts using data from pre-existing disparate chart[s] of accounts in accordance with an embodiment of the present invention. Such charts of accounts may be disparate because each is associated with offices and/or subsidiaries located in remote foreign locations that have unique local requirements. Further, the offices and/or subsidiaries may offer distinct products and services. As a result, in order to meet the unique reporting requirements of each location and/or divisions, each location and/or division may maintain their own chart or charts of accounts structured to serve their particular needs. The initial steps of the process 500 begins when a determination is made as to whether to create the new chart of accounts manually or by downloading old chart[s] of accounts at step 502. If the new chart of account is to be manually created, then the process moves to step 504. Otherwise, the process moves to step 510. In step 504 set up one or more dimensions and one or more attributes associated with each dimension. Dimensions may be created by assigning unique names to each dimension. Comments and description for each dimension may also be created and associated with each dimension. Attributes may be created by creating names for each attribute and assigning each attribute to a single dimension. At step 506, create values for the dimensions and attributes that were setup in the previous step (examples of which were provided above). At step 508, link the correct attribute values to the correct dimension values, recalling that attributes may only be linked to a single dimension.

Rather than loading dimension and attribute values manually, the dimensions and attribute values may also be uploaded from old charts of accounts rather than loading manually. This approach may be particularly useful if one has to create several hundred values (e.g., accounts). The process of uploading values from old charts of accounts involves uploading files from the old chart[s] of accounts. In order to upload files from old chart of accounts, the files to be uploaded will preferably have the same format as the table to which they are appended. Thus, at step 510 identify and format the file[s] to be uploaded. To format the file, preferably the following columns should be in the file.

Dimension Instance Reference: reference of the uploaded record in the source file. This can be any logical reference number;

Dimension Instance Name (also referred to as Dimension Values): for example, "cash and cash equivalent, other assets, and the like.

Dimension Name: for example account, movement, and the like. This should be the dimension ID as defined in the dimension table. The dimension table is the location within the database application, in this example MS Access, where the Dimension Name is created.

Mark for Deletion: by default the value will be NO.

Data Source: to indicate from what data source the data have been uploaded. For example, name of old general ledger system.

Account code in the current system;

Account code in the new system. This may be used to sort all data items.

After other rows and columns are created to match the format of the new system, the file[s] may be appended to the dimension instance table. The dimension instance table is the location within the database application, in this example MS Access, where the Dimension Instance Names (or Dimension Values) are created.

If during the upload of the old chart of accounts, it was not possible to immediately specify the correct dimensions for all the dimension values that have been uploaded earlier then the missing dimension[s] that were not specified earlier may be specified after the uploading step. Thus, at step 514, the development tool determines whether additional dimension [s] need to be specified. If so, then the missing dimension[s] is specified at step 516. Note that this is an optional step.

At step 518, the required combinations are created. These combinations define how particular accounts will be analyzed. In order to be able to retrieve afterwards the reason for the creation of the combination, it may be possible to: specify what the particular report is that requires the particular combination; define a reference to a specific section of that report; and define the entity of the company for which the combination is required. In order to complete the above, the following steps should be completed. First, select the dimensions to be linked such as, for example, country—currency—data value type—accounting basis—valuation type, maturity—segment—data value type—accounting basis—valuation type, and the like. Next, specify the entity for which the data requirement has been created, the reference where this data requirement can be found and the reporting requirement that requires the data.

Combinations define how data may be analyzed. For instance, combinations may define how particular accounts may be analyzed. In order to be able to determine the purpose of the combination, comments relating to a particular combination may be created and stored. Such comments may provide the reason for the creation of the combination, define a reference to a specific section of that report, and define the entity of the company for which the combination is required. Examples of combinations includes:

Country—Currency—Data Value Type—Accounting Basis—Valuation Type

Maturity—Segment—Data Value Type—Accounting Basis—Valuation Type

The above two examples are essentially lists of dimension combinations. In order to obtain a specific data item, dimension values corresponding to, for example, each of the dimensions listed in a combination such as those listed in the above two examples, should be identified. Thus, it is not the combination itself that will actually generate the desired data but rather, the combination will define the allowable dimension value combinations.

The creation of a combination will eventually result in the generation of desirable data based on, for example, reporting requirements. As a result, certain aspects of the data being sought should also be defined. For instance, the entity for which the data requirement has been created should be specified, the reference where this data requirement may be found and the reporting requirement that requires the data, should all be preferably identified.

Note that the number of combinations created will drive the complexity of the data model. In other words, as more combinations are created, the more complex the data model becomes. Since not all possible combinations are typically needed, it is preferable to minimize the number of combinations only to those that are needed. Thus, the selection of which combinations to create will typically be driven by reporting requirements.

At step 520, the new chart of accounts is mapped to existing charts of accounts, general ledgers, source systems, and the like. One of the key functionalities of the data model development tool, according to one embodiment of the present invention is the possibility of mapping a new chart of accounts to old chart of accounts. The results of such a mapping exercise can be used to identify data gaps or to do conversions from old data structures to new data structures. In order to map to existing charts of accounts or other data models, the mapping functionality of the development tool must first be correctly set-up by importing the existing data structure that is to be mapped to. The data structure may be, for example, old charts of accounts or other old data models. The file[s] to be uploaded should be structured in the same way as that of the new data structure. The file to be uploaded will preferably contain columns that identifies the entity to which the data structure pertains and the name of the data structure that is being uploaded. Additional columns may also be incorporated into the file being uploaded. For instance, for charts of accounts, columns for "account number," "account description," "additional account description," "title," and "title value," may be created and used to store dimensions. The uploaded file may be created using Microsoft's Excel™, ASCII format or in any other format commonly known to those skilled in the art. In order to upload the file, the path to the file should first be specified before actually uploading the selected file. If no data structures are available to which one wishes to map, the mapping may be performed by manually creating data items and mapping to the created data items. With charts of accounts, mapping will be to accounts contained in the old chart of accounts. The following steps may be followed in order to map to old accounts. First, identify the account name to map and/or provide the reference of the account to map. Next, specify the data requirement of the account[s] to map if it is required. The parent level may also be specified for the account[s]. The parent level is the next higher level in the hierarchy of the old chart of accounts. Based on these search criteria, a search for accounts that satisfy the criteria may then be conducted. The search may produce a number of possible accounts. One or more of the possible accounts may then be selected for mapping.

Once mapping is completed, other steps (not shown in FIG. 5) that were discussed previously may be undertaken. These steps include, for example, locating and bridging gaps at the new chart of account, generating mapping files and generating various status reports such as combinations reports, account hierarchy reports and mapping reports (discussed below).

The data model development tool according to the present invention may provide several optional functionalities. For example, the development tool may provide a functionality called "perfect match." This functionality can be used to perform one to one, one to many, many to one and many to many mappings. In order to implement the perfect match functionality, certain steps may be performed. These steps include defining search criteria for accounts that need to be mapped. Based on the search criteria, several possible matches may be identified. One or more of the possible accounts may be selected for mapping. Comments relating to the mapping may be documented.

The development tool may permit the creation of mapping files. Mapping files may be used for historic data conversation. For instance, suppose that there are three accounts in a general ledger account. Suppose further that a single account in the centralized data model is mapped to the three accounts. This relationship may be used in the future to update or to use different base data for the three accounts to generate new data for the single account based on different base data. For example, for each quarter or each month, account information may be updated and therefore, the relationship above may be used to update the information contained in the single account based on updated information of the three original accounts.

The development tool may be used to identify data items that are required in the target data model that are not available in the systems to which the mapping is performed even before mapping is commenced. In other words, data gaps that are already known may be identified prior to the mapping step. In doing so, the step of attempting to map a data item that is not available can be avoided. The tool may also allow users to identify data items that does not need to or should not be mapped. This may occur when there are existing data in one or more of the source systems that supports the data item being sought but for some reason the system user chooses not to use the existing data for generating the data item. Comments relating to the decision for not mapping a particular data item may be documented.

The development tool may further provide a functionality called "potential match." The potential match functionality may be used to identify data requirements of the target data model that could potentially be linked to data items of the mapped data structure even though the mapping is not perfect (for instance, when the numbers need to be adjusted or further iterations are required). This enables a record to be made of data in the old chart of accounts, which is not exactly the same as that required in the target data model (or target chart of accounts). The data in the old chart of accounts will need to be adjusted in some way in order for it to be compatible with the target data model (this adjustment is not performed in the development tool).

The development tool may provide the ability to create and document comments relating to data items in order to track the source of the data. In generating reports, it may be important to have an understanding of the source of the data used to generate reports. The tracking of data may become more difficult as a company switches over to a centralized data structure and some of the intermediate systems are decommissioned. The ability of those at the, for example, central sites, to see the gaps and to oversee the mapping process provides an advantage over conventional approaches. This means that those at the central site will preferably be able to view gaps, how the gaps were bridged and the various iterations that were performed locally.

The development tool may allow users to document changes made to data models. Since the data models will typically change as various parts or personnel of the business organization continuously review and revise the model, it is important that the changes made to data models be recorded and when the changes were made. This may assist users in identifying which version of the model that they are working with.

The development tool may provide capabilities to generate various types of reports such as combinations reports, account hierarchy reports and mapping reports. A combination report provides an overview of all combinations and values. As such, it may provide a complete overview of all data requirements stored in the database. The account hierarchy report provides an overview of the hierarchical structure of the accounts. It can be used as a starting point for the creation of a new structured chart of accounts. In order to be able to generate this report, certain assumptions need to be true. For instance, an "account" dimension has been created, an "account hierarchy" attribute has been created, and for each account that is created, the account that sits "one-level higher" in the account hierarchy defined as attribute value for that particular account. The mapping report provides an overview of the mapping information contained in the database. It allows system users to track all mapping information for a particular entity.

It will be apparent to those skilled in the art that various modifications and variations can be made in the wheel assembly of the present invention without departing from the spirit or scope of the invention. Thus, it is intended that the present invention covers the modifications and variations of this invention provided that they come within the scope of any claims and their equivalents.

The invention claimed is:

1. A computer implemented method for generating a multi-dimensional data structure in order to access data stored at a plurality of data sources, said plurality of data sources being disparate, having disparate source data structures, and having a different number of dimensions than said multi-dimensional data structure, said method comprising:
- defining at least one dimension and a dimension value associated with the at least one dimension for said multi-dimensional data structure;
- defining an attribute and an attribute value associated with the attribute for said multi-dimensional data structure, wherein the attribute is assigned to a single dimension;
- creating a plurality of combinations of dimension values, wherein a combination defines a data item,
  - wherein the plurality of combinations comprise a first set of data items and a second set of data items,
  - wherein said multi-dimensional data structure is defined by the dimensions associated with the first set of data items, and
  - wherein the second set of data items comprises data items associated with the dimensions associated with the plurality of data sources;
- mapping data items in the first set of data items in said multi-dimensional data structure to corresponding data items in the second set of data items;
- determining a data gap wherein the mapping step results in a difference between the dimension characteristics of the first set of data items and the second set of data items;
- bridging the gap by at least one of the following:
  - obtaining, from one of the plurality of data sources, a further data item for mapping to one of the data items in the first set, wherein the further data item is not originally obtainable in the second set of data items and is generated from one or more of the plurality of data sources;
  - modifying the multi-dimensional data structure to be further defined by the second set of data items; or
  - converting a source data structure in at least one of the plurality of data sources into a source data structure defined by at least one data item in the first set of data items;
- documenting how the gap was bridged; and
- creating a mapping file for historic data conversion, wherein the mapping file is configured to store relationships between data items in historical data sources for use in generating new data items from historical data sources.

2. The method of claim 1, wherein said gap is bridged at said plurality of data sources.

3. The method of claim 1, wherein said creating the combinations includes linking two or more dimensions for said combination created.

4. The method of claim 3, wherein said mapping includes mapping the combination to a data structure for one of the data sources.

5. The method of claim 1, further comprising generating a report, wherein said report is a combination report, a hierarchy report, or a mapping report.

6. A method according to claim 1, wherein the multi-dimensional data structure comprises a centralized database.

7. A method according to claim 6, wherein the centralized database is located at a central office.

8. A program storage device readable by a machine, tangibly embodying a program of instructions executable by a machine, said instructions for generating a new multi-dimensional chart of accounts that is used to access data stored at a plurality of source charts of accounts, wherein said plurality of source charts of accounts are disparate, have disparate source data structures, and have a different number of dimensions than said new multi-dimensional chart of accounts, the program storage device executing the method comprising:
- defining at least one dimension and a dimension value associated with the at least one dimension for said new multi-dimensional chart of accounts;
- defining an attribute and an attribute value associated with the attribute for said multi-dimensional data structure, wherein the attribute is assigned to a single dimension;
- creating a plurality of combinations of dimension values, wherein a combination defines a data item,
  - wherein the plurality of combinations comprise a first set of data items and a second set of data items,
  - wherein said new multi-dimensional chart of accounts is defined by the dimensions associated with the first set of data items,
  - wherein the second set of data items comprises data items associated with the dimensions associated with the plurality of source charts of accounts;
- mapping data items in the first set of data items in said new multidimensional chart of accounts to corresponding data items in the second set of data items;
- determining a data gap wherein the mapping step results in a difference between the dimension characteristics of the first set of data items and the second set of data items;
- bridging the gap by at least one of the following:
  - obtaining, from one of the plurality of source charts of accounts, a further data item for mapping to one of the data items in the first set, wherein the further data item is not originally obtainable in the second set of data items and is generated from one or more of the plurality of source charts of accounts;
  - modifying the new multi-dimensional chart of accounts to be further defined by the second set of data items; or
  - converting a source data structure in at least one of the plurality of source charts of accounts into a source data structure defined by at least one data item in the first set of data items; and
- documenting how the gap was bridged; and
- creating a mapping file for historic data conversion, wherein the mapping file is configured to store relationships between data items in historical source charts of accounts for use in generating new data items from historical source charts of accounts.

9. The program storage device of claim 8, wherein said gap is bridged at said plurality of source charts of accounts.

10. The program storage device of claim 8, wherein said dimension is at least one of a dimension for a product, an industry classification and a maturity.

11. The program storage device of claim 10, wherein said dimension value associated with said product dimension is one of corporate loans, mortgages, home credits and personal loans.

12. The program storage device of claim 8, wherein said method further comprises linking two or more dimensions for a created combination.

13. The program storage device of claim 12, wherein said method further comprises mapping a combination for a dimension value to said plurality of source charts of accounts.

14. The program storage device of claim 8, wherein the method further comprises generating a report, wherein said report is a combination report, a hierarchy report, or a mapping report.

15. A program storage device according to claim 8, wherein the multidimensional chart of accounts comprises a centralized database.

16. A program storage device according to claim 15, wherein the centralized database is located at a central office.

17. A tool for generating a multi-dimensional data structure for integrating data stored at a plurality of data sources, said plurality of data sources being disparate, having disparate source data structures, and having a different number of dimensions than said multi-dimensional data structure, said tool comprising:
- a relational database;
- a processor;
  - a data structure generator, wherein said data structure generator defines at least one dimension and a dimension value associated with the at least one dimension;
  - an attribute module, wherein said attribute module defines an attribute and an attribute value associated with the attribute for said multi-dimensional data structure, wherein the attribute is assigned to a single dimension;
  - a combination module for creating and retrieving a plurality of combinations of dimension values,
    - wherein a combination defines a data item,
    - wherein the plurality of combinations comprise a first set of data items and a second set of data items,
    - wherein said multi-dimensional data structure is defined by the dimensions associated with the first set of data items, and
    - wherein the second set of data items comprise data items associated with the dimensions associated with the plurality of data sources;
  - a mapping module for mapping data items in the first set of data items in the multi-dimensional data structure to corresponding data items in the second set of data items;
  - a gap detector for detecting a data gap wherein the mapping step results in a difference between the dimension characteristics of the first set of data items and the second set of data items; and
  - a gap resolver for facilitating bridging of the gap by at least one of the following:
    - obtaining, from one of the plurality of data sources, a further data item for mapping to one of the data items in the first set, wherein the further data item is not originally obtainable in the second set of data items and is generated from one or more of the plurality of data sources;
    - modifying the multi-dimensional data structure to be further defined by the second set of data items; or
    - converting a source data structure in at least one of the plurality of data sources into a source data structure defined by at least one data item in the first set of data items; and
    - wherein the gap detector and resolver document how gaps are bridged; and
  - a mapping file module for creating a mapping file used for historic data conversion, wherein the mapping file module is configured to store relationships between data items in historical data sources for use in generating new data items from historical data sources.

18. The tool of claim 17, wherein said tool is in communication with said plurality of data sources via an electronic network.

19. The tool of claim 17, wherein said gap is bridged at said plurality of data sources.

20. The tool of claim 17, wherein said combination module creates the combination by linking two or more dimensions.

21. The tool of claim 17, further comprising a report generator for generating a report, wherein said report is a combination report, a hierarchy report, or a mapping report.

22. A tool according to claim 17, wherein the multi-dimensional data structure comprises a centralized database.

23. A tool according to claim 22, wherein the centralized database is located at a central office.

* * * * *